United States Patent
Karaman et al.

(10) Patent No.: US 7,332,088 B1
(45) Date of Patent: Feb. 19, 2008

(54) METHOD OF WATER PURIFICATION

(75) Inventors: Marilyn E. Karaman, Aranda (AU); Sivaraj Shanker, Willoughby (AU); Heriberto Alejandro Bustamante, Sylvania (AU); Richard Mark Pashley, Aranda (AU)

(73) Assignee: Sydney Water Corporation (AU)

( * ) Notice: Subject to any disclaimer, the term of this patent is extended or adjusted under 35 U.S.C. 154(b) by 0 days.

(21) Appl. No.: 09/646,347

(22) PCT Filed: Mar. 18, 1999

(86) PCT No.: PCT/AU99/00173

§ 371 (c)(1),
(2), (4) Date: Jan. 4, 2001

(87) PCT Pub. No.: WO99/47456

PCT Pub. Date: Sep. 23, 1999

(30) Foreign Application Priority Data

Mar. 18, 1998 (AU) .................................... PP2428

(51) Int. Cl.
*C02F 1/28* (2006.01)
(52) U.S. Cl. ...................... 210/679; 210/691
(58) Field of Classification Search ............... 210/691, 210/764, 668, 679; 422/28
See application file for complete search history.

(56) References Cited

U.S. PATENT DOCUMENTS

| | | | |
|---|---|---|---|
| 2,114,576 A | 4/1938 | Schinman | ................ 210/712 |
| 4,344,928 A | 8/1982 | Dupin et al. | ................. 423/626 |
| 5,242,595 A | 9/1993 | Morgart et al. | ............. 210/636 |
| 5,432,077 A * | 7/1995 | Farrah | .......................... 435/244 |
| 5,512,491 A * | 4/1996 | Mehkeri et al. | ............. 436/177 |
| 5,855,788 A * | 1/1999 | Everhart et al. | ............ 210/653 |
| 5,858,246 A * | 1/1999 | Rafter et al. | ................. 210/764 |
| 6,054,059 A * | 4/2000 | Latimer et al. | ............. 210/767 |

FOREIGN PATENT DOCUMENTS

| | | |
|---|---|---|
| EP | 0626346 | 11/1994 |
| FR | 2425407 | 12/1979 |
| FR | 2748468 | 11/1997 |
| JP | 02102780 | 4/1990 |
| JP | 04158865 | 6/1992 |
| JP | 6298528 | 4/1993 |
| JP | 8117737 | 5/1996 |
| RU | 2026734 | 12/1992 |
| SU | 1066942 | 5/1982 |

OTHER PUBLICATIONS

Walker, Mark J., et al., "Sorption of *Cryptosporidium parvum* Oocysts in Aqueous Solution to Metal Oxide and Hydrophobic Substrates," *Environ. Sci. Technol.*, 33:3134-3139, (1999).
Shaw, Kathy, et al., "Improving Filtration of Cryptosporidium," *Journal AWWA*, 92:103-111 (2000).

* cited by examiner

*Primary Examiner*—Matthew O. Savage
(74) *Attorney, Agent, or Firm*—Hunton & Williams LLP

(57) ABSTRACT

The invention provides a method for the removal of biological species, such as *Cryptosporidium*, from water using aluminium based media which contains surface Al—OH groups.

8 Claims, 8 Drawing Sheets

Scale Bar 200μm

Figure 4

Cryptosporidium oocysts (4-6μm)

Alumina or silica

Alumina or silica

Alumina or silica

◄─────► Scale Bar 200μm

Figure 5

METHOD OF WATER PURIFICATION

TECHNICAL FIELD

The present invention relates to a method for the purification of water. More particularly, the present invention relates to the removal of microbiological contaminants from water.

BACKGROUND ART

The presence of microbial pathogens in water bodies, such as rivers, dams, seawater and swimming pools, where human contact is likely to occur, or, in water intended for human or animal contact and/or consumption, is a potential hazard with the potential to result in illness, disability or even death where these pathogens are inadvertently ingested by humans or animals. Accordingly, there exists a variety of methods for their removal so as to render contaminated water safe for human contact and/or consumption.

Known methods of removing pathogens from contaminated water include mechanical filtration, i.e. physical exclusion based on the size of the microbial pollutants, chemical treatment such as chlorination and ozonation and electrolysis which generates oxidants fatal to the pathogens.

*Cryptosporidium* can survive up to six months in a moist environment and have been known to contaminate public swimming pools. Several outbreaks of cryptosporidiosis due to contaminated swimming pools have been reported. the contamination is usually due to faecal accidents in the pool and the spread of infection amongst pool users can be rapid. This is partly due to the ineffectiveness of current disinfection procedures. As swimming pools do not normally monitor for *Cryptosporidium*, awareness of a problem is invariably through incriminating epidemiological evidence. In many cases, cryptosporidiosis manifests as infectious diarrhea with risks of complication in the immunocompromised/immunosuppressed population, for example the very young, the very old, transplant recipients and those undergoing immunotherapy.

In the case of raw water, *Cryptosporidium* oocysts may be removed by conventional water treatment processes during the production of potable water. These processes involve coagulation with coagulants such as ferric chloride or alum followed by addition of polyelectrolytes as coagulant aids and in some cases high molecular weight polymeric organic filter aids. The coagulated material is removed by either sedimentation or filtration through sand filters.

Water treatment processes are not completely reliable for the removal of *Cryptosporidium* oocysts and in many cases oocysts breakthrough the plant into the reticulation system. Accordingly conventional disinfectants, such as chlorine or ozone, are added to the filtered water prior to reticulation as a precaution in order to destroy some common water borne pathogenic microorganisms that may have broken through the water treatment plant. However, *Cryptosporidium* oocysts are unaffected by these disinfectants.

In addition, it is always possible that viable microorganisms may be introduced between the water treatment plant and the domestic user. This may occur by sewage infiltration.

Therefore *Cryptosporidium* oocysts that enter into the reticulation system pose extremely serious public health concerns since no cure exists for cryptosporidiosis.

In addition to potable water, water in swimming pools, spa pools and other recreational waters may contain, *Cryptosporidium* mainly through faecal contamination introduced by pool users as well as potentially through the potable water used in the swimming pools.

Normally in swimming pools and spas, the water is continuously filtered through sand filters to remove particulate material and disinfected by chlorine addition followed by recirculation. In some instances low concentrations of inorganic coagulants are added to optimise solids removal. However, if *Cryptosporidium* contamination occurs, removal by filtration or coagulation/filtration through sand filters may not be completely effective. Detection of oocysts results in pool closure for the treatment of the water, for example, by superchlorination at a level of 3-5 mg/L. The efficiency of superchlorination as treatment for deactivating *Cryptosporidium* not guaranteed. The use of other stronger disinfectants such as ozone, chlorine oxide or mixtures of strong oxidants has also been tested with mixed success.

Thus whilst there are a number of processes well recognised for the treatment of water sources to produce potable water or to treat recreational waters, a significant problem remains in the ability of those processes to produce water, particularly potable water, that complies with strict regulatory requirements in relation to pathogenic microorganism content. Regrettably, conventional water treatment processes have proven unreliable for their removal from water sources.

The present inventors have recognised the critical importance of providing a means by which microorganisms, particularly pathogenic microorganisms, that may remain after conventional water treatment processes may be removed prior to the distribution of the potable water to the end users.

DISCLOSURE OF INVENTION

The present inventors have now discovered that aluminium based media possessing surface Al—OH groups provides a means for the removal of pathogens present in water.

Accordingly, in a first aspect, the present invention provides a method for the removal of biological species from water comprising the step of contacting the water with an aluminium based medium which contains surface Al—OH groups for a time and under conditions such that a proportion of the biological species are adsorbed onto said medium and removed from the water.

In a second aspect, the invention contemplates the use of an aluminium based medium which contains surface Al—OH groups in the removal of biological species from water.

The present inventors believe that for the first time, this invention provides a practical way to remove dangerous water borne pathogens, such as *Cryptosporidium*, using a process which is readily adaptable to existing water treatment processes.

Many pathogens possess active surface groups, such as carboxylate and phosphate groups associated with cellular glycoproteins, which are available for interaction, for example, by chemical or electrostatic means, when contacted with active surface groups of an external medium. One particular pathogen is *Cryptosporidium*, which the present inventors have found possesses a $pk_a$ value of 2.5 suggesting the presence of negatively charged groups (such as carboxylate or phosphate groups) on the organism's surface. Additional studies indicated that maximum negative surface potential of around −27 mV was achieved at a pH greater than 5.7 in aqueous solution.

Close contact between surfaces can result in the formation of chemical bonds between surface sites on the approaching surfaces. This is called chemisorption and typically occurs between carboxylate, phosphate and wide range of metal cations such as aluminium, calcium, iron etc. in natural systems. The precise nature of these chemical interactions is often complex but may involve ligand bonding to carboxylate and phosphate groups on the surface of micro-organisms. In addition, van der Waals forces generally act to pull colloids together into strong adhesive contact.

Thus, as used herein, the terms "adsorb" and "adsorption" may refer to either electrostatic adsorption or chemisorption.

The biological species for removal by the method of the invention include human or animal pathogens such as protozoa exemplified by *Cryptosporidium* and *Giardia*, bacteria exemplified by *Pseudomonas, Escherichia coli*, and *Vibria cholerae*, viruses, exemplified by poliovirus 1 and coliphage MS-2 and algae.

A preferred aluminium based medium for use in the invention is alumina ($Al_2O_3$) which is hydrated at the surface so as to form surface Al—OH groups. This material presents a chemically active substrate for the direct adsorption of suitable biological species. Surprisingly, the present inventors have found that surface hydrated alumina has the ability to strongly bind microorganisms especially protozoa such as *Cryptosporidium* and *Giardia*. It is, however, critically important that the alumina is in the appropriately hydrated form.

The alumina may be presented in any number of physical forms such as powders, granules, crystalline solids, or compressed discs or wafers and may exist in the amorphous state or as $\alpha$-$Al_2O_3$ or $\gamma$-$Al_2O_3$.

Particulate alumina, such as powdered and granulated forms, provide an increased surface area per volume and are suitable for packaging into cartridges which can be used alone or in conjunction with other filtration systems. Powdered and granular alumina is readily available in different diameter size ranges for example, from about 15 mm down to about 50 microns (0.05 mm). The size of the particulate alumina used may be varied depending on the application. By way of example only, one particulate size range contemplated by the invention is from about 5 mm to about 1 mm for example, about 3-2 mm. Another particulate size range is from about 1.5 mm to about 0.5 mm. Yet another particulate size range contemplated by the present invention is from about 0.5 mm to about 0.05 mm, for example 0.3 mm to about 0.1 mm.

Depending on the application generally the particle sizes will be between 500 microns (0.5 mm) to 13 mm. The most suitable size range will be selected in terms of effective size and uniformity coefficient.

In the case of municipal water treatment, usually larger particles size, typically greater than 1 mm would be preferred in order to achieve appropriate water throughputs. However, pilot plant testing may be carried out to establish the optimum relationship between the thickness of the alumina bed and the particle size to ensure maximum removal whilst maintaining high water throughputs.

Similarly in the case of water treatment for industrial purposes, such as in the preparation of water for use in the manufacture of food and pharmaceuticals, relatively large volumes of water will be treated. Accordingly, a similar approach to municipal water will usually be adopted. It must, however, be realised that the use of filter cartridges containing the hydrated alumina may be desirable in some manufacturing facilities.

In both municipal and private swimming pools applications it may be appropriate to use finer particles, say between 0.5-2 mm to maximise collision and capture of biological species by the particles.

In the purification of domestic water it would be appropriate to use smallest particle sizes to both minimise the size of the filter device and to achieve maximum surface area whilst ensuring that pressure drops across the filter cartridge containing the alumina are minimised.

It is within the scope of this invention to utilise the hydrated alumina as part of a mixed filter bed. In this form, the hydrated alumina is generally disposed on the downstream side of the inflowing water. In this way, the water will preferably have been conventionally treated prior to contacting the hydrated alumina. The person skilled in the art will appreciate that the mixed filter bed may include discrete beds of hydrated alumina of different particle size ranges.

It is also important to appreciate that in some applications, it may be permissible to utilise beds of hydrated alumina that are fed under gravity.

In order to maximise the adsorptive capacity of the hydrated alumina for biological species, preferably the alumina bed will be used as polishing filter. Thus, in some embodiments of the present invention it is envisaged that the hydrated alumina will be used as a separate polishing "monofilter" after the conventional filters that remove the flocs from the flocculated raw water. In this configuration it is easier to take the filter off-line when it is exhausted in order to chemically regenerate the alumina. It must be recognised that there may be some applications where the alumina may be used with little or no pretreatment of the inflowing water.

Prior to contacting the water with the hydrated alumina, in the case of the treatment of municipal water, both turbidity and colour are usually removed by the addition of suitable inorganic coagulants and organic polyelectrolytes. If the municipal water is hard, preferably the water will be softened by lime softening, lime-soda ash softening or excess-lime treatment.

Furthermore, the hydrated alumina may be used for the treatment of the supernatant of the backwash water in the preparation of municipal water, thus ensuring that biological species such as *Cryptosporidium* is removed. Backwash water is generated in water treatment plants by reversing the water flow through a filter in order to remove the material trapped. The backwash water is normally decanted and the supernatant may be recycled to the head of works.

In a domestic water situation, the water will have already have been treated by the normal processes as described above. However it is always possible that viable microorganisms may remain in the water supply or may be introduced between the water treatment plant and the domestic user. This may occur by for instance sewage infiltration to the reticulation system.

Whilst swimming pool water is not classified as potable water it is important that its microorganism contents is kept within standard limits. This is particularly important in the case of public swimming pools and spas. In order to maintain water quality swimming pool water is desirably subjected to filtration and disinfection. As chlorine is inefficient as a disinfectant against *Cryptosporidium* it is important to be able to remove it from the swimming pool water as the water is being filtered prior to recirculation.

An advantage of the present invention is that it may be readily utilised as an adjunct to existing water treatment facilities. As mentioned above, in most applications, the hydrated alumina bed will be used as a final polishing filter.

This permits an existing water treatment facility to be upgraded by retrofitting an additional stage after the current water treatment stages.

The aluminium based medium, preferably hydrated alumina, may be packed into a suitable, high flow rate filtration cartridge and may, for example, be used as the final stage in a swimming pool pumping-filtration unit. Alternatively, such cartridges may be used directly in conjunction with a domestic water reticulation system. In this form, the cartridge may be fitted to tap(s) from which drinking water is to be obtained or to the inflow from the municipal water supply. In a domestic situation, it may also be appropriate to use a bed of hydrated alumina contained within a gravity fed cartridge. In this situation, water is simply fed under gravity through a cartridge that is open to receive the water at one end and at the other end, allows the water to drain into a receiving vessel. Alternatively, the hydrated alumina may be contained in a water permeable bag. In this situation, the bag containing the hydrated alumina is immersed in a vessel of water to be treated for a suitable contact period.

For the majority of applications, the contact time between the aluminium based medium and the water to be treated will be minimal. Typically contact times of between about 5 seconds and 1 hour will be sufficient to achieve normal removal. The contact time is, however, dependent on a variety of factors applicable to each use situation such as the extent of the contamination, the available surface area of alumina for contact with the water, i.e. particle size and volume of alumina, the surface density of hydroxyl groups and the flow rate of water over or through the alumina. The person skilled in the art will appreciate that a suitable contact time may be established through appropriate testing and evaluation.

The surface density of Al—OH groups on the surface of the aluminium based media occurs ideally at an average rate greater than about 1 hydroxy group per 10 $nm^2$ of surface (1 hydroxy group per 10 $nm^2$), preferably greater than about 1 hydroxy per group 5 $nm^2$, 1 hydroxy per group 3 $nm^2$ especially 1 hydroxy per group 2 $nm^2$. Most preferably, the density of the surface hydroxy groups occurs at an average rate greater than about 1 hydroxy per group 1 $nm^2$, especially greater than about 1 hydroxy per group 0.75 $nm^2$ or about 1 hydroxy per group 0.5 $nm^2$. When the $Al_2O_3$ surface is essentially fully hydrated, thereby providing a maximized surface area available for adsorption of the biological species to be separated, the average rate of surface Al—OH groups per $nm^2$ of surface area, is about 1 hydroxy per group 0.18 $nm^2$ to about 1 hydroxy per group 0.25 $nm^2$. In general terms, fully hydrated alumina is most effective for the removal of biological species.

Because of the nature of the alumina surface, activated alumina (dehydrated alumina) still contains some hydroxylated sites for example less than about 1 hydroxy group per 10 $nm^2$. However, this material is ineffective in removal of Cryptosporidium from contaminated water. The introduction of surface Al—OH groups onto activated alumina is thermodynamically favoured and can be achieved by hydrating methods known to those skilled in the art, for example activated alumina may be soaked with water for a prolonged time. A second method involves treatment with sodium hydroxide (NaOH), where the upper alumina surface is dissolved thus allowing other hydroxyl groups to be formed. In a third method, the activated alumina may be treated by exposure to ultraviolet light in the presence of water vapour. This process produces ozone which breaks the Al—O—Al bond allowing the formation of Al—OH. In a fourth method activated alumina is treated with, the peroxide produces a hydroxyl radical which attacks the Al—O—Al bond allowing the formation of Al—OH. These methods may be controlled to introduce the desired frequency of Al—OH groups over the surface area. By way of example, only the alumina surface may be hydroxylated by treatment of the alumina in $1 \times 10^{-2}$M NaOH or in 30% w/v/$H_2O_2$ for more than one hour or treatment with ozone in the presence of water vapour.

In general terms, operation of the invention will result in at least a 1 log reduction in the biological species present in the water. In the context of this specification, a log reduction refers to a 10 fold reduction. For example, if there were 1000 microorganisms per ml in a water sample, a 1 log reduction would result in 100 microorganisms remaining. A 2 log reduction would result in 10 microorganisms remaining. Preferably there will be a 2 log reduction, desirably a 3 log reduction, most preferably a 4 log reduction. It is especially preferred that the invention operates to such that there is at least a 5 log reduction, particularly a 6 log reduction. Removal of the proportion of the biological species may be achieved in one treatment or, optionally the process of contacting the contaminated water with the Al—OH surface may be repeated to provide the desired level of removal of the biological species from the water.

As the following Examples describe, Cryptosporidium oocysts are found to strongly adsorb onto alumina surfaces containing surface Al—OH groups. The results indicate that once adsorption onto the alumina takes place, the oocysts are strongly resistant to desorption, even in solutions at higher pH values, where the surfaces will be more negatively charged. Such an independence of pH is a process safeguard because the oocysts will not be released on the water due to small pH variations.

It appears that alumina is a specific substrate for Cryptosporidium oocyst adsorption. The adsorbed oocyst layer appears to be stable and resistant to desorption with pH and EDTA treatment. Without limiting the invention by theory, Cryptosporidium adsorption may be due to a specific chemisorption between the alumina surface and either the carboxylate or phosphate groups or some other groups present on the oocyst surface.

MODES FOR CARRYING OUT THE INVENTION

The invention will now be described with reference to the following non-limiting Examples and Figures. In these examples, removal of Cryptosporidium from water is described. It will of course be appreciated by persons skilled in the art that other biological species, particularly microbiological pathogens may be removed from water using this invention.

BRIEF DESCRIPTION OF DRAWINGS

FIG. 4 schematically depicts a size comparison between Cryptosporidium oocysts and individual alumina or silica spheres.

FIG. 5 schematically depicts the retention of Cryptosporidium oocysts onto packed and unpacked columns of silica and alumina.

EXAMPLES

Materials and Methods

Figure 1:
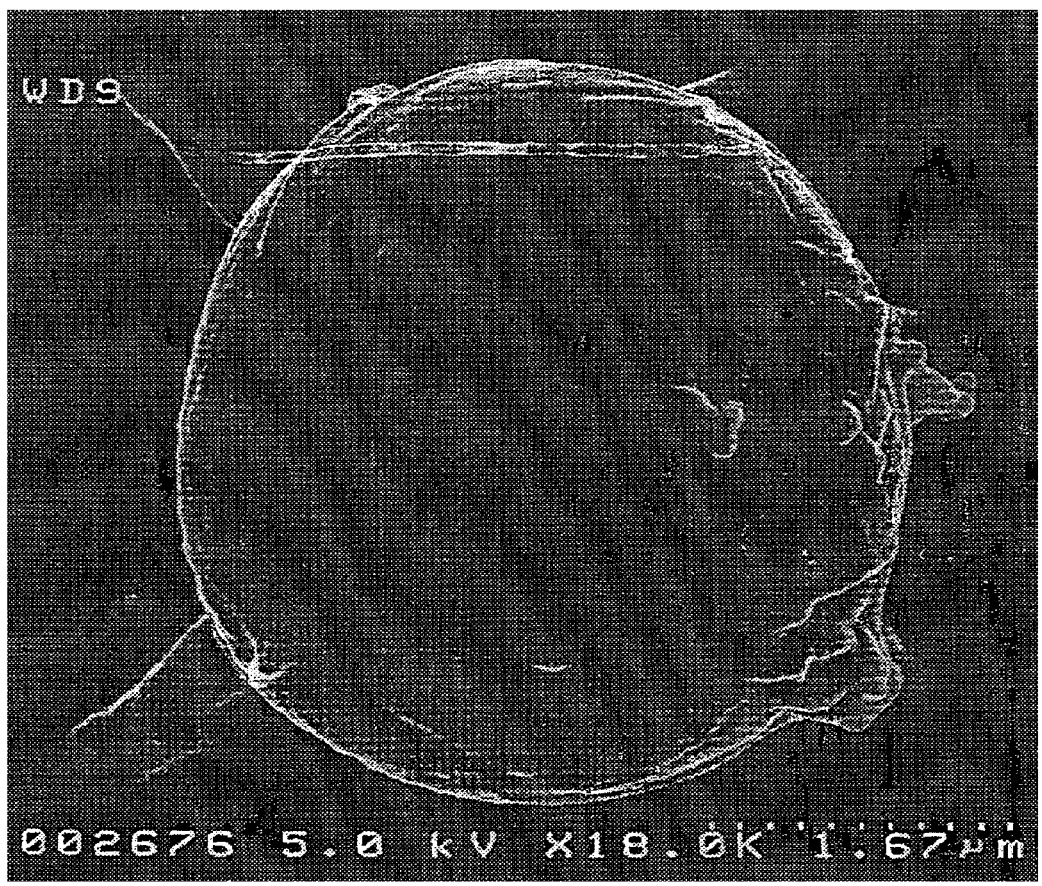
FIG. 1 depicts an electron micrograph of a Cryptosporidium oocyst.
Figure 2:
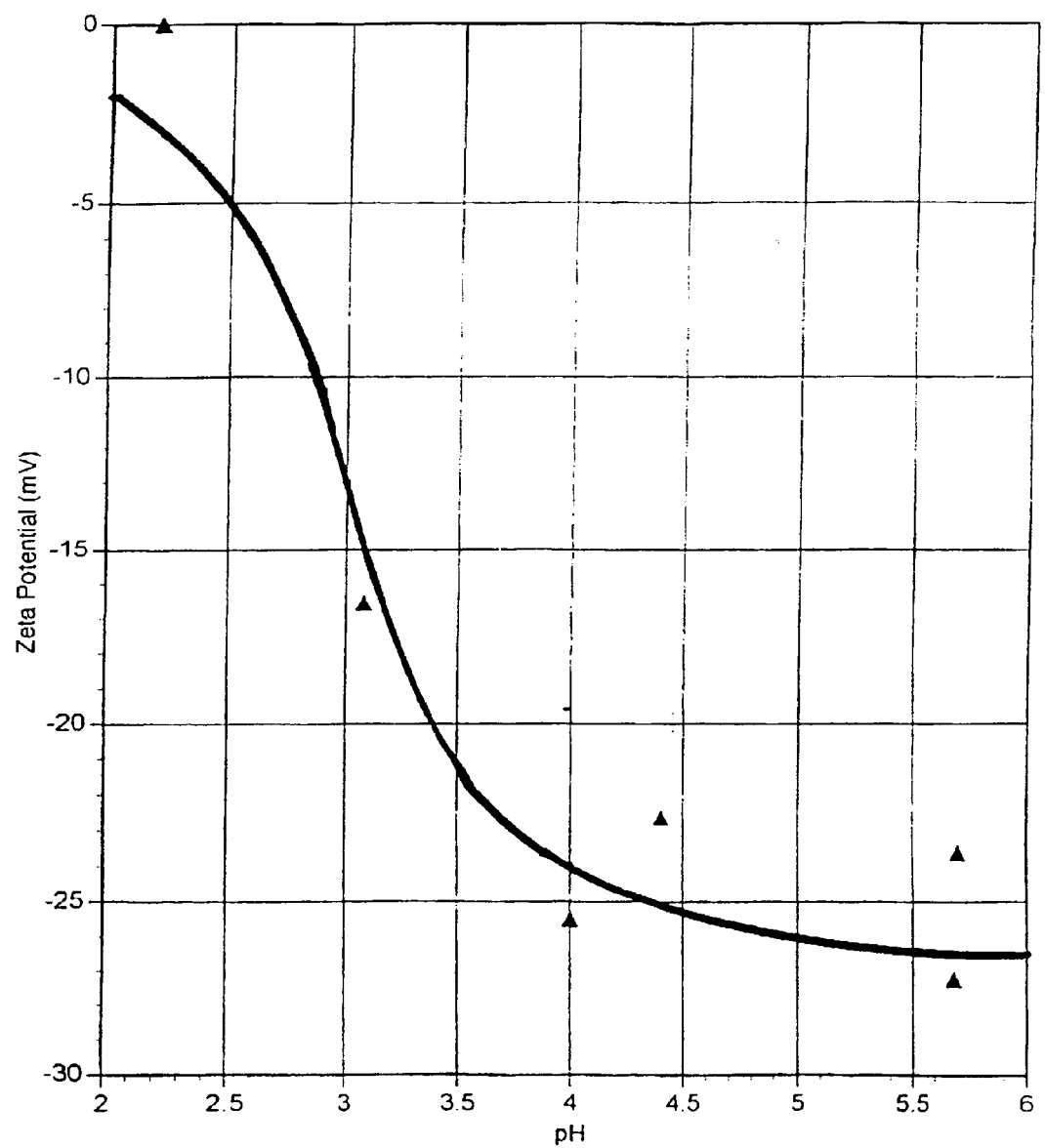
FIG. 2 is a graphical representation of the change in zeta potential of Cryptosporidium oocysts in $10^{-3}$M NaCl as a function of pH.

The γ irradiated bovine *Cryptosporidium* oocyst samples were supplied by Australian Water Technologies (AWT) at a concentration of $5 \times 10^6$ and $3 \times 10^8$ oocysts/ml in distilled water which was stored at 4° C. prior to use.

The water used in this study was produced from tap water, which was fed through a Memtec Krystal Kleen™ unit using a three-stage purification process (prefilter, reverse osmosis and activated charcoal) before being distilled, collected and stored in a positive pressure, dust free laminar flow cabinet to prevent air borne contamination.

Pure alumina ($\alpha$-$Al_2O_3$) in the form of flat, optically smooth 4 inch discs, was obtained from Silica Source Technology, Temple, Ariz., USA.

Alumina powder (63-200 μm diameter) was obtained from Merck (art. 1077). The alumina sample was fractionated in water to separate out only the largest of the particles for column separation investigations. The purpose of selecting the largest particles was to prepare a packed column of alumina in which the pores between the individual spheres would be large compared with the size of *Cryptosporidium* oocyst (see FIG. 4). Therefore any *Cryptosporidium* retention would be solely due to adsorption rather than a physical retention based on a size exclusion alone. The alumina was dispersed in aqueous solution, shaken and quickly allowed to settle, the fine dispersed phase was decanted off and the remaining material redispersed. This process was repeated 20×, each time discarding the dispersed material until only the largest particles were retained.

In order to mimic conventional sand filter, parallel column filtration experiments were carried out using ballotini (glass) spheres of diameters greater than around 150 μm which were prepared in a similar fashion to the alumina particles. This enabled the preparation of columns with sufficiently large pores that would prevent oocysts capture by size exclusion (see FIG. 4).

Adsorption Studies

Alumina substrates, immediately after cleaning using UV irradiation, were directly exposed to 100 μl of a $5 \times 10^6$ oocysts/ml *Cryptosporidium* solution. The treated substrates were placed into a covered petrie dish housed inside another larger moist petrie dish in a refrigerator for several hours allowing oocysts to adsorb to the surface. After this time the liquid was decanted off and the substrate was rinsed with distilled water. Any residual liquid removed by way of capillary action using filter paper. The substrate were then examined under a Kombistereo Wild M32 light microscope having a magnification range 162-1000× using a Intralux 5000 optical fibre light source. The adsorption density was photographed with a Kodak 400 flexi clear film at a film speed of 200 ASA using a Nikon camera.

Figure 5:
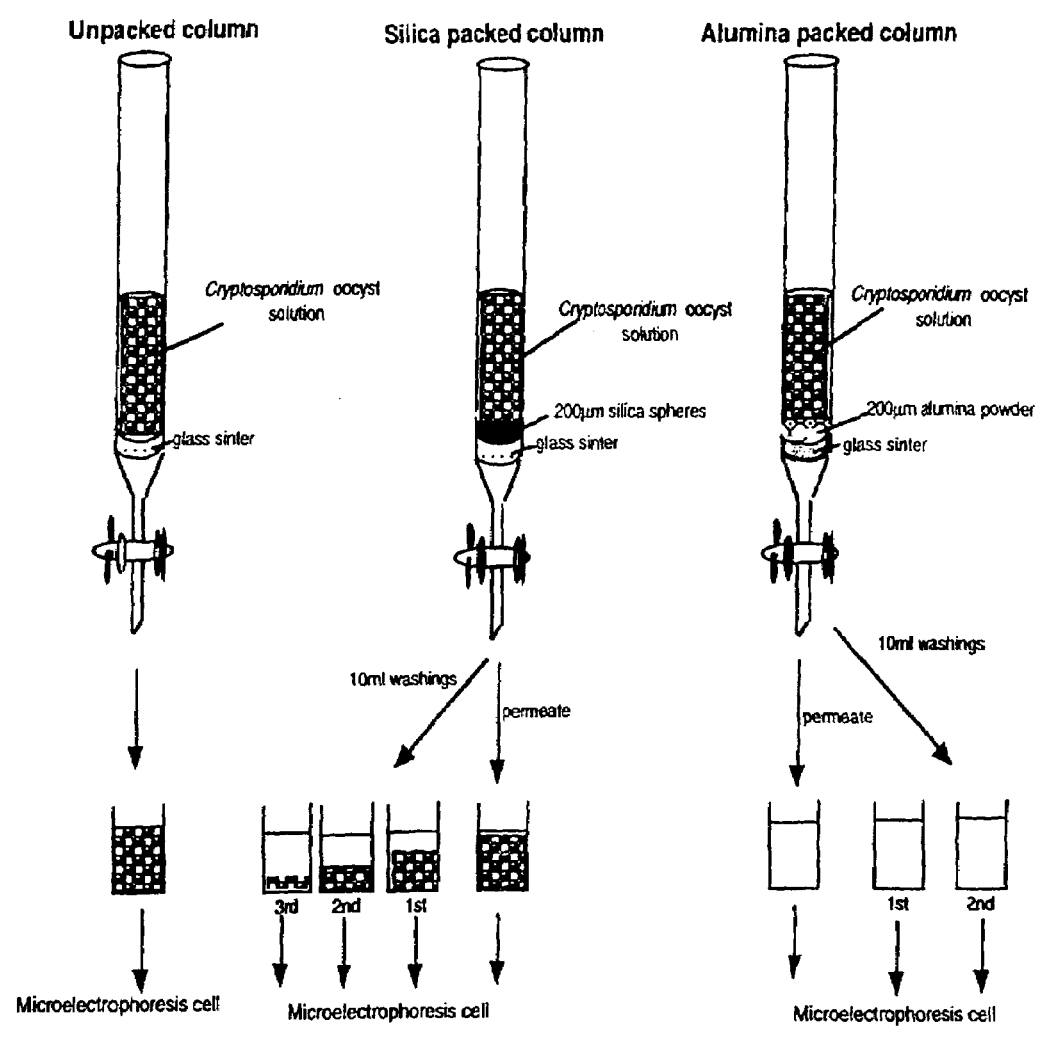

Column Separations (1) A slurry of the larges alumina particles (prepared as described above) was transferred to a glass chromatography column (28 mm O.D) containing a #3 glass sinter the excess liquid was run from the column leaving a packed column having a depth of 5 mm (see FIG. 5). A 100 μl of the *Cryptosporidium* sample at $3 \times 10^8$ oocysts/ml was diluted to 25 mls in a volumetric flask, 10 ml of this solution was then transferred to the alumina packed column, and the solution allowed to stand 15 minutes before being allowed to percolate through the alumina at a rate (10 ml/hr) into glass vials. After the entire contents had come through, the column was washed twice times with 10 ml of distilled water allowing it to percolate through at a similar rate to that of the original *Cryptosporidium* sample. Each 10 ml fraction was collected, transferred to a microelectrophoresis cell and examined using dark field illumination. This determination of the density and charge of any particles present.

(2) A slurry of the largest Ballotini spheres was transferred to a glass chromatography column (28 mm O.D) containing a #3 glass sinter the excess liquid was run from the column leaving a packed column having a depth of 5 mm (see FIG. 5). A 100 μl of the *Cryptosporidium* sample at $3 \times 10^8$ oocysts/ml was diluted to 25 mls in a volumetric flask, 10 ml of this solution was then transferred to the packed silica column, and the solution allowed to stand 15 minutes before being allowed to percolate through the silica at a rate (10 ml/hr) into glass vials. After the entire contents had come through, the column was washed three times with 10 ml of distilled water allowing it to percolate through at a similar rate to that of the original *Cryptosporidium* sample. Each 10 ml fraction was collected, transferred to a microelectrophoresis cell and examined using dark field illumination. This allowed determination of the density and charge of any particles present.

Example 1

Direct Adsorption on Alumina

The *Cryptosporidium* oocyst sample received from AWT was $5 \times 10^6$ oocysts/ml. Since the oocysts are approximately 5 μm in diameter, the area per oocyst of $1.9 \times 10^{-7}$ $cm^2$ means the number of oocysts required to cover a 1 $cm^2$ substrate is $5 \times 10^6$. In these studies we have used 0.1 ml samples of the original $5 \times 10^6$ oocysts/ml sample.

Pure alumina ($\alpha$-$Al_2O_3$) wafers were cut to an appropriate size and UV irradiated at (λ185 and 254 mm) for 1 hr in the presence of water vapour to remove any organic contamination. The UV irradiation in the presence of water vapour and oxygen produces ozone and hydroxyl radicals which clean the alumina surfaces rendering them hydrophilic. After UV irradiation a small droplet of distilled water was placed on the substrates to ensure the surfaces were hydrophilic, then blown dry under a gentle stream of nitrogen.

Figure 6:
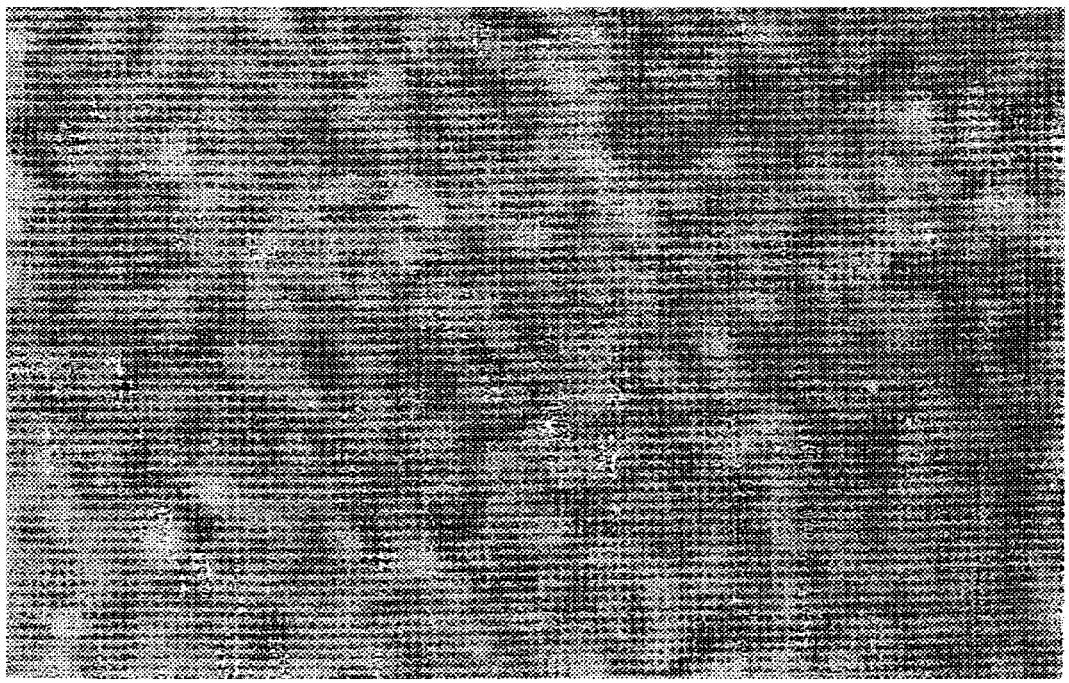
FIG. 6 is a photograph of the optically smooth surface of an alumina wafer having a few extraneous dust particles.

The blank substrates were examined under a Kombistereo Wild M32 light microscope having a magnification range 162-1000×. The alumina wafer was highly polished and so only dust contamination and the roughness of the reverse side of the wafer enabled us to focus on the smooth surface. FIG. 6 is a photograph of the microscope focussed on the optically smooth surface having a few extraneous dust particles attached. This indicated that the wafer would provide an excellent, optically smooth surface for adsorption investigations using light microscopy.

Figure 3:
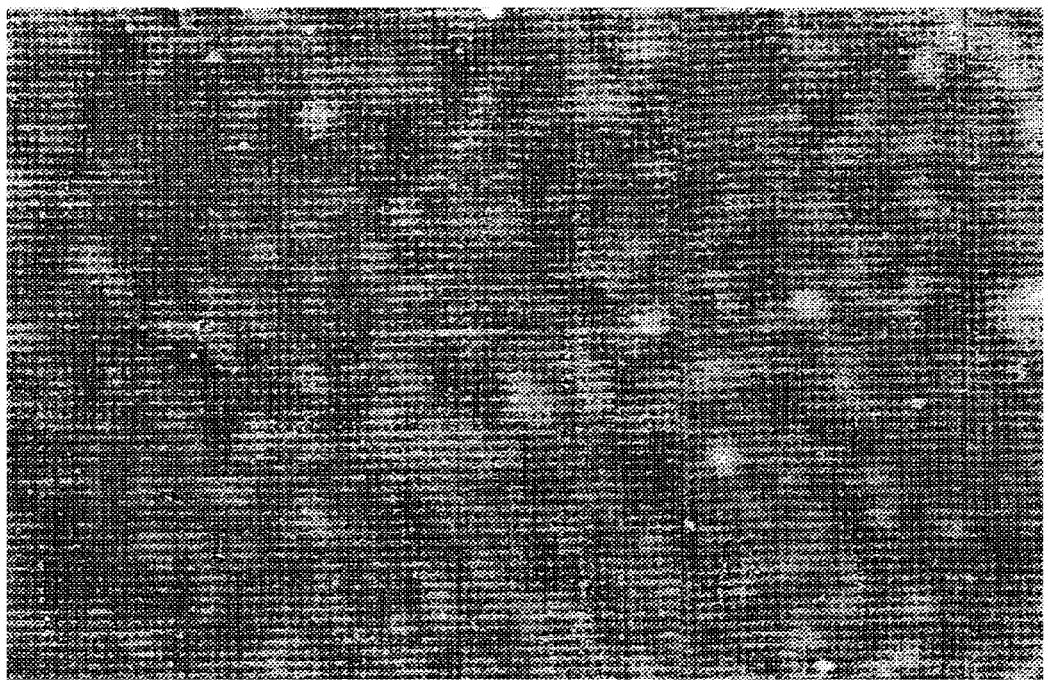
FIG. 3 is a photograph of Cryptosporidium oocysts adsorbed onto polished alumina wafers.

The hydrated alumina wafer was directly exposed to 0.1 ml of a 5×10⁶ oocysts/ml solution. The treated substrate was placed into a covered petrie dish housed inside another larger moist petrie dish in a refrigerator for several hours allowing oocysts to adsorb to the positively charged surface. After this time the liquid was decanted off the substrate and any residual liquid removed by way of capillary action using a filter paper. The substrate was examined in a similar manner to that of the blank. When focussed on the alumina surface, a uniform layer of about $\frac{1}{10}$th monolayer coverage of oocysts was observed (see FIG. 3) which is consistent with the original oocyst density (i.e. $5 \times 10^5$ oocysts), suggesting that all or most of the oocysts were recovered from solution by direct adsorption to the alumina substrate.

To test whether adsorbed oocysts could be easily desorbed, the coated alumina substrate was placed into a covered beaker containing distilled water for approximately 20 hours. After this time, the substrate was taken out with the aid of tweezers and any residual liquid removed via capillary action using a filter paper, it was then examined under the microscope. The adsorption density of oocysts was unchanged, indicating that the adsorbed oocysts were stable in water at pH 5.7. This result is consistent with the observation that alumina is positively charged at this pH. Furthermore, it also indicates that *Cryptosporidium* oocysts have a high affinity for the alumina surface.

To test whether the oocysts would remain adsorbed to alumina substrates at higher pH values, the coated alumina was placed into buffer pH 9.2. At this pH the alumina becomes negatively charged which might cause oocyst desorption if the adsorption was purely electrostatic in origin.

However, after leaving the coated substrate for 16 hours at this pH the substrate was examined under the microscope, again no oocyst desorption was found to occur. This could be either because at this pH the (negative) surface potential is still too weak to overcome the strong van der Waals attraction or because once the oocysts have adsorbed, strong short range ligand bonds are formed between the surface aluminium and the carboxylate or phosphate groups present on the oocyst surface. To test whether the low surface potential could be the reason for the failure to desorb, we placed the coated substrate in a pH 10 buffer (where the alumina should acquire a high negative surface potential) for several hours, again no oocyst desorption was observed. This provides further evidence that the resultant oocyst adsorption was due to a relatively strong specific chemisorption.

Example 2

Column Separators

A glass chromatography column (28 mm O.D) containing a #3 glass sinter was chosen for column separations (see FIG. 5). In order to ensure the pores of the glass sinter were large enough to allow the *Cryptosporidium* oocysts through, a 10 ml sample of $1.5 \times 10^6$ oocysts/ml was passed through the glass sinter of the unpacked column.

The column permeate was collected and transferred to a microelectrophoresis cell and examined using dark field illumination. At the first stationary level about 125 negatively charged particles (oocysts) were observed. This demonstrated that oocysts could easily pass through the glass sinter.

(2.2) Silica Blank

The silica (Ballotini) spheres were fractionated to a size approx 200 μm in diameter as described earlier. The glass column was packed to a depth of 5 mm with the fractionated large Ballotini spheres. 10 ml of distilled water was allowed to percolate through the packed column and the permeate collected. The permeate was transferred to a microelectrophoresis cell. This not only allowed us to test whether the sinter was of sufficient porosity to retain the silica support but it also allowed determination of the background levels. The sinter was found to adequately retain the packing support, since the permeate typically had about 8 negatively charged particles in the field of view.

(2.3) Silica Packed Column

The silica (Ballotini) spheres were fractionated to a size approximately 200 μm in diameter. A slurry of these spheres was transferred to a glass chromatography column (28 mm O.D) containing a #3 glass sinter the excess liquid was run from the column leaving a packed column having a depth of 5 mm. A 100 μl of the *Cryptosporidium* at $3 \times 10^8$ oocysts/ml was diluted to 25 mls in a volumetric flask, 10 ml of this solution was then transferred to the packed silica column, and the solution allowed to stand 15 mins before being allowed to percolate through the silica at a rate (10 ml/hr) into glass vials. After the entire contents had come through, the column was washed three times with 10 ml of distilled water allowing it to percolate through at a similar rate to that of the original *Cryptosporidium* sample. Each 10 ml fraction was collected, transferred to a microelectrophoresis cell and examined using dark field illumination.

Figure 7:
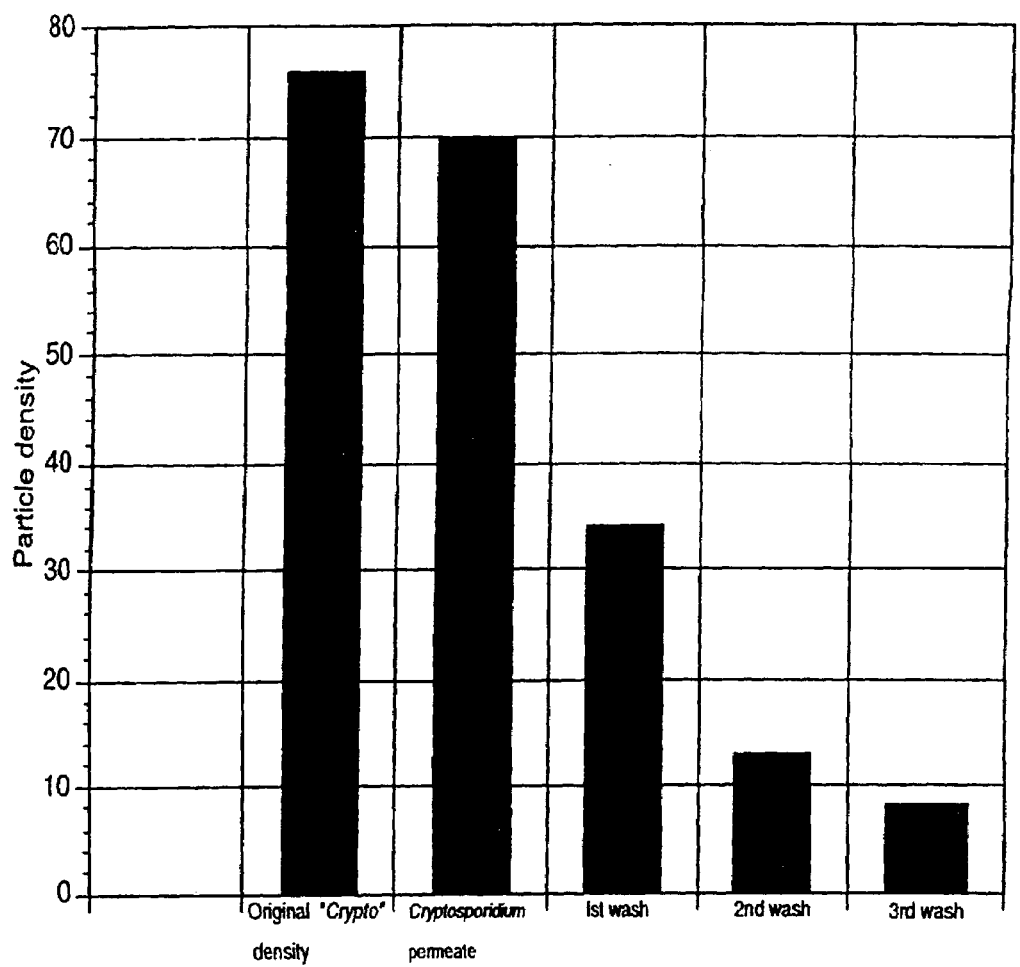
FIG. 7 graphically depicts the permeate levels of *Cryptosporidium* oocysts adsorbed after repeated washings through a silica column.

The *Cryptosporidium* sample before passing through the packed support contained about 75-78 negatively charged particles at a given plane of view within the cell. The permeate which was passed through the packed column was seen to have about 70 negatively charged particles. Three further 10 ml washings were put through the column to see whether the *Cryptosporidium* would desorb or whether there was a lag time involved in total "*Cryptosporidium*" recovery. The first, second and third washings were found to contain 34, 13 and 8 negatively charged particles, respectively. The results obtained are shown graphically in FIG. 7. This demonstrates that *Cryptosporidium* was not retained in the column support (i.e. no adsorption evident) thus allowing the oocysts to travel through large intra-pore spacing between adjacent silica particles.

(2.4) Alumina Blank

The alumina powder was fractionated to a size approximately 200 μm in diameter as described in materials and methods. The glass column was packed to a depth of 5 mm with the fractionated alumina powder. 10 ml of distilled water was allowed to percolate through the packed column and the permeate collected. The permeate was transferred to microelectrophoresis cell and set at the first stationary level. This allowed determination of whether the sinter was of sufficient porosity to retain the alumina support as well as background levels. The sinter was found to adequately retain the packing support, since the permeate typically had about 14 negatively charged particles at any plane of view.

(2.5) Alumina Packed Column

The alumina powder was fractionated to a size approximately 200 μm in diameter as previously described. A slurry of this hydrated alumina powder was transferred to a glass chromatography column (28 mm O.D) containing a #3 glass sinter. The excess liquid was run from the column leaving a packed column having a depth of 5 mm. A 100 μl of the *Cryptosporidium* at $3\times10^8$ oocysts/ml was diluted to 25 mls in a volumetric flask, 10 ml of this solution was then transferred to the alumina packed column, and the solution allowed to stand 15 mins before being allowed to percolate through the alumina at a rate (10 ml/hr) into glass vials. After the entire contents had come through, the column was washed twice with 10 ml of distilled water allowing it to percolate through at a similar rate to that of the original *Cryptosporidium* sample. Each 10 ml fraction was collected, transferred to a microelectrophoresis cell and examined using dark field illumination. This permitted determination of the density and charge of any particles present.

Figure 8:
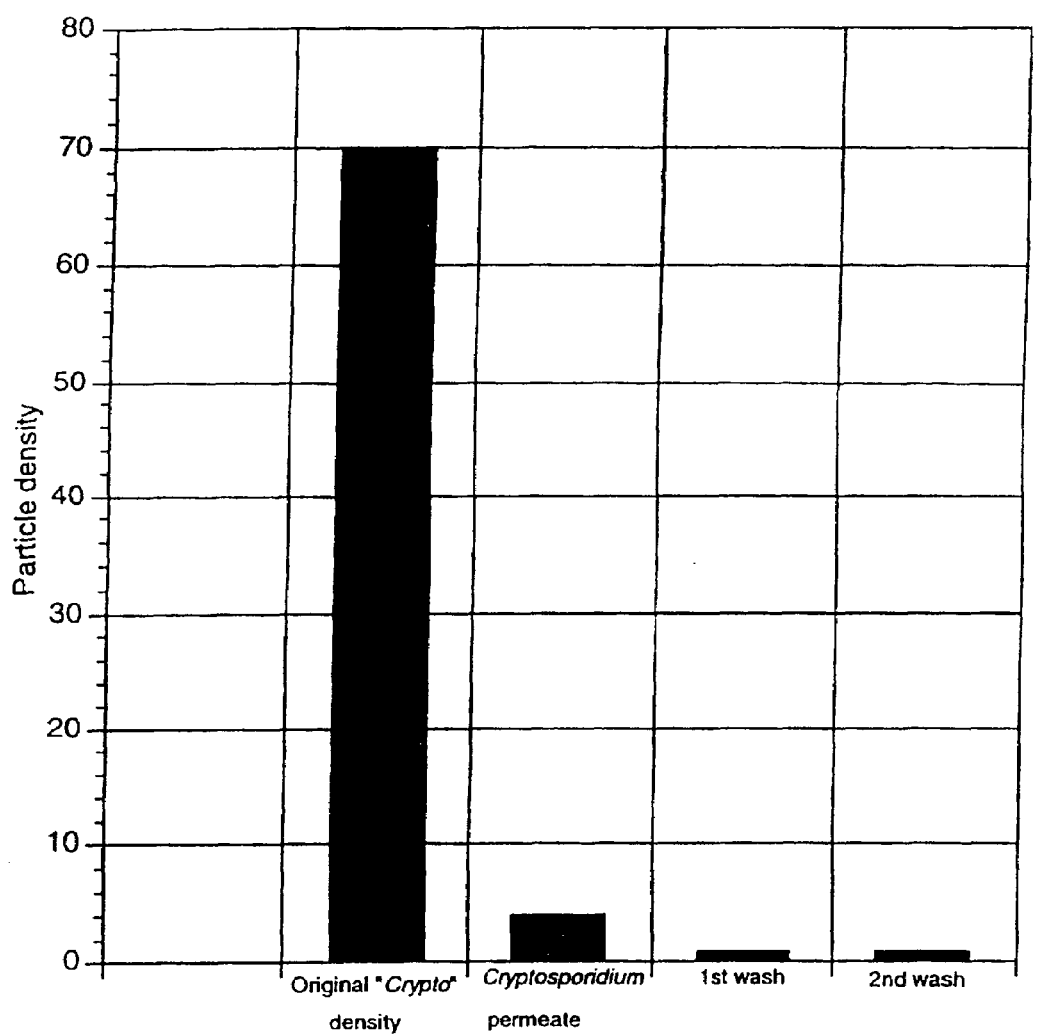
FIG. 8 graphically depicts the permeate levels of *Cryptosporidium* oocysts adsorbed after repeated washings through an alumina column.

The *Cryptosporidium* sample before passing through the packed support contained about 70 negatively charged particles at a given plane within the cell. By comparison, the permeate which was passed through the packed column was seen to have only 4 negatively charged particles (i.e below background level) at the given plane. Two further 10 ml washings were put through the column to see whether the *Cryptosporidium* could be easily desorbed. The second and third washings were found to contain only 1 negatively charged particle (see FIG. 8).

This demonstrated that *Cryptosporidium* was retained in the column due to adsorption, as the intra-pore spacing between adjacent alumina particles would have presented no barrier based on size exclusion alone. Also, repeated washings provided good evidence that the oocysts could not be easily desorbed.

Example 3

To investigate the various rapid rehydroxylation methods the alumina was heated to 610° C. and the powder treated either with $H_2O_2$ or NaOH. The powder was then dried in the oven at 110° C. to remove surface water and tested to see whether the powder fines floated or sank. The method developed involved taking a sample of the powder on the end of a spatula and then as approach the surfaces at an angle of 45° the powder was slowly moved through the air/water interface, the spatula was then slowly withdrawn and if the powder was not fully hydroxylated the powdered fines floated, whereas if the powder was fully hydroxylated in appeared to be wetted and ran off the end of the spatula.

NaOH Treated Alumina.

We tested the powders treated with $1\times10^{-5}$, $5\times10^{-4}$ and $1\times10^{-2}$M NaOH for an hour. The powders treated with $1\times10^{-5}$, $5\times10^{-4}$ floated whereas the $1\times10^{-2}$ M NaOH treated sample sank indicating that the particles of alumina had become hydrophilic.

$H_2O_2$ Treated Alumina.

We tested the powders treated with 10% w/v $H_2O_2$ for ½ Hr and 1 hr and with 30% w/v $H_2O_2$ for 5, 10, 15, 30, 60, 120 and 225 mins. We found that the powders <1 hr floated whereas times greater than 1 hr sank indicating that these experiments demonstrate that hydroxylation of alumina may be accomplished in a rapid and efficient manner using treatment with either sodium hydroxide of hydrogen peroxide solutions.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

The invention claimed is:

1. A method for the removal of *Cryptosporidium* from water comprising the steps of contacting the water with a medium consisting essentially of particulate alumina having a diameter in the range of about 0.5 mm to about 1.5 mm, which alumina contains surface Al—OH groups occurring at an average rate of 1 hydroxyl group per 0.25 nm² to 1 hydroxyl group per 0.18 nm² surface area, for a time from 5 seconds to 1 hour so as to effect at least a 1 log reduction of *Cryptosporidium* present in the water by adsorption thereof onto said alumina.

2. A method for removing *Cryptosporidium* from water so as to render the water suitable for human use or for use in swimming pools or spa pools, the method comprising contacting the water with a medium consisting of particulate alumina having a diameter in the range of about 0.5 mm to about 1.5 mm and surface Al—OH groups at an average rate of about 1 hydroxyl group per 0.25 to about 1 hydroxyl group per 0.18 nm² of surface area for a time from 5 seconds to 1 hour, so as to result in at least a 1 log reduction of the *Cryptosporidium* present in the water by adsorption thereof onto said alumina.

3. The method according to claim 2 where the water is intended for human consumption.

4. The method according to claim 2 wherein at least a two log reduction of *Cryptosporidium* present in the water is effected by adsorption thereof onto said alumina.

5. The method according to claim 2 wherein at least a three log reduction of *Cryptosporidium* present in the water is effected by adsorption thereof onto said alumina.

6. The method according to claim 2 wherein at least a four log reduction of *Cryptosporidium* present in the water is effected by adsorption thereof onto said alumina.

7. The method according to claim 2 wherein at least a five log reduction of *Cryptosporidium* present in the water is effected by adsorption thereof onto said alumina.

8. The method according to claim 2 wherein at least a six log reduction of *Cryptosporidium* present in the water is effected by adsorption thereof onto said alumina.

* * * * *